United States Patent Office 3,075,884
Patented Jan. 29, 1963

3,075,884
SLAB CHEWING GUMS CONTAINING ACTIVE INGREDIENTS AND METHOD OF PREPARING SAME
Anthony George Bilotti, Queens Village, N.Y., and Raymond Mengert Hainer, Lexington, Mass., assignors to American Chicle Company, Long Island City, N.Y., a corporation of New Jersey
No Drawing. Filed Feb. 13, 1961, Ser. No. 88,638
17 Claims. (Cl. 167—82)

This invention relates to novel slab chewing gums and to processes for producing same. More particularly this invention relates to slab chewing gums containing solid active ingredients and to processes of producing same. Still more particularly this invention relates to slab chewing gums containing substantially water insoluble solid active ingredients and to processes for producing same.

There is a considerable market demand for slab chewing gums containing active ingredients for nutritional or pharmacological purposes. However, at present there is no slab gum on the market suitable for such purposes because gum manufacturers have been unable to produce a slab chewing gum which allows for ready release of the active ingredients from the chewing gum particularly when the ingredients are not freely water soluble.

It is generally well known that nearly all active ingredients incorporated into slab chewing gums heretofore have been chewed into the base from which they are released at a rate too slow to be of value. This is true even for some water soluble materials. For example, when water soluble chlorophyll is incorporated into slab chewing gum as the active ingredient, the chlorophyll is chewed into the gum base and only a small fraction of the chlorophyll is released from the base so that a substantial amount of the activity of the chlorophyll is lost. This problem is even more serious when water insoluble active materials, such as dicalcium phosphate, or when oil soluble materials such as flavors and most medicaments, are incorporated into the gum as the active ingredients. The release of the active ingredients from the gum base is a major problem and one which has confronted the industry for a long time despite the fact that slab chewing gums on a weight basis are more than 75% water soluble materials such as sugar and corn syrup.

It therefore has been the usual practice in the industry when manufacturing chewing gums having active ingredients to deposit the active ingredient upon the exterior of a gum nugget or center, usually with an underlying thin layer of sugar, and to cover the unit with a final layer of hard sugar. The outer layer of hard sugar is generally produced by tumbling the units in coating pans into which saturated solutions of sugar are poured and the water driven out by aeration, the finished piece being commonly called "candy coated gum." The use of candy coated gum allows for the dissolution of the active ingredient in the mouth before it is chewed into the gum base.

It is therefore apparent that the production of a slab gum containing active ingredients would not only be of great value to the industry generally because it would eliminate the costly method of producing candy coated gums, but would also be of considerable value to the consumer because consumers overwhelmingly prefer slab gums to candy coated gums.

Slab chewing gum generally consists of four basic components namely gum base, corn syrup, sucrose and flavoring. The gum base is composed of natural gums, synthetic resins, waxes, fillers and softeners and generally represents about 20–30% of the finished gum. The corn syrup is a clear colorless or slightly yellow non-crystallizable viscous tacky liquid usually consisting of mixtures of dextrose, maltose and other high molecular weight saccharides. The corn syrup represents about 15–20% of the finished gum and is employed primarily for its softening and binding properties. The sucrose is generally ordinary cane sugar, in powdered form, and represents between about 50–65% on a weight basis of the gum formula. The sugar is primarily used as a filler and to impart the desired sweetness to the finished product. Any suitable flavor may be employed for the purposes of enhancing the taste of the finished product and the flavor usually represents about 0.5–1.5% by weight of the finished product.

In the preparation of slab chewing gum, the base is first prepared by placing the various ingredients which make up the base, i.e., the natural gums, synthetic resins, waxes, fillers, etc. in a mixing kettle containing mixing blades or agitators and thoroughly blending the various components. To the completed base is added all the corn syrup, sugar and flavoring material and the entire mass is then subjected to mild heat, for example, about 100–110° F. and thoroughly mixed such that the constituents are blended into a homogeneous dough-like mass. The mass is then unloaded from the kettle, cooled, rolled, scored and broken into individual slab pieces. A gum batch having total weight of 100 lbs. generally consists of about 20–30 lbs. of base and 70–80 lbs. of corn syrup and sugar, the major portion of the latter being sugar.

It is therefore the primary object of this invention to provide novel processes for producing slab chewing gums containing activated ingredients. It is another object of this invention to prepare novel chewing gums containing active ingredients which are substantially released from the gum by chewing. These and other objects of the invention will be apparent from the following detailed description.

In view of the problems associated with the manufacture of slab chewing gums containing active ingredients, it was indeed surprising that we found during the course of our investigations that we could produce slab chewing gums containing active ingredients which can be readily released from the gums without having to radically disrupt existing gum manufacturing procedures and without the necessity for employing expensive special equipment.

According to our invention, we provide a method of preparing slab chewing gum containing solid active ingredients which are not freely soluble, corn syrup, sucrose and an insoluble gum base which tends to bind said solid active ingredients against release from the slab gum during the chewing of said gum, said method comprising intimately admixing said active ingredients in at least a portion of said corn syrup prior to mixing said corn syrup portion with said insoluble gum base, intimately mixing together all of the said materials and then forming from said mixture units for use.

The method of this invention thereby produces a slab chewing gum comprising an insoluble gum base which tends to bind active ingredients against release from the gum during the chewing of the gum homogeneously blended with sucrose, flavors and solid powdered active ingredients individually coated with the corn syrup.

In carrying out the process of this invention, active ingredients such as phosphates, chlorophyllins, vitamins, enzymes, antacids, fluorides and other active materials in solid form may be incorporated into the slab gum. The amount of active ingredients incorporated in the corn syrup will of course vary with the particular active ingredients to be used. For example, when dicalcium phosphate is employed as the active ingredient, we prefer to use 1.0 to 10% by weight based on the weight of the gum, whereas when an enzyme is to be incorporated in the gum, we prefer to use about 0.05% to 15% by weight based on the weight of the gum depending on the concentration of the enzyme. The active ingredients are generally employed in the form of solids of 100 mesh size, or less, and preferably should have an average mesh size of about 270.

These active ingredients in the slab gum are very quickly dissolved upon chewing the gum and a very substantial portion of the total active ingredients in the gum are released from the gum during the initial 30 minutes of chewing. In fact between 65–92% of the active ingredient incorporated in the slab chewing gum may be released from the gum during the first 30 minutes of chewing as contrasted with about 15%–45% release of active ingredients during the same time when the active ingredient is added directly to the gum formula. The actual amount of active ingredient released depends to a great extent on the active ingredient. However, we have found in our experiments that there is always a substantial improvement in the amount of active ingredient released when the methods of this invention are employed. Furthermore, the rate at which the active ingredient is released is also materially enhanced such that as much as 15% of the active ingredient is released during the first 6 minutes of chewing.

The active ingredients may be incorporated into the gum in a number of ways. For example, the active ingredient may first be intimately admixed with the entire corn syrup component of the slab gum so as to form a homogeneous mixture of the solid active ingredient dispersed throughout the corn syrup. This mixture is then blended in the usual and customary manner with the gum base and with the sucrose and flavoring agents. The mixture is then formed into slabs as is customary.

Alternatively and preferably we prefer to take a portion of the corn syrup used to make the completed gum, e.g. about half of the normal corn syrup complement of the gum, and blend the active ingredient with this portion of the corn syrup so as to form a homogeneous dispersion of the solid active ingredient throughout the corn syrup portion. Prior to mixing this portion with the gum base, sucrose, flavoring agents and the remaining portion of the corn syrup are intimately mixed together so as to form a homogeneous mixture. The corn syrup portion containing the blended active ingredient is then added to this mixture and the entire mass is thoroughly agitated so as to form a homogeneous dispersion of the active ingredient in corn syrup throughout the blend. The mixture is then formed into individual gum slabs as customary.

The difference in release of active ingredients from the gums of this invention as contrasted with active ingredients incorporated into slab gums prepared in accordance with conventional procedures will be seen from the following examples which are illustrative of the invention.

EXAMPLE 1

Two batches of slab gums were made in the following manner. In Batch No. 1, dicalcium phosphate was incorporated into a 43° Baumé corn syrup mix. This mixture replaced a portion of the corn syrup normally used in the making of slab gums. This mixture was added to a gum batch containing the gum base, sucrose, flavoring and remaining portion of corn syrup and thoroughly mixed therewith. In Batch No. 2 dicalcium phosphate was added directly to the gum formula and thoroughly mixed therewith. The slab gums prepared from both batches were then chewed for 30 minutes. The gums were then analyzed for the percent of active ingredient released. These results are set forth in Table I below:

*Table I*

| Sample | Wgt. Gum | Wad Attenuation, Percent | Wt. Residue | Wt. Residue Corrected for CaCO₃ | Percent Residue | Percent Dicalcium Phosphate Dihydrate | Percent Release after 30 Minutes |
|---|---|---|---|---|---|---|---|
| Batch #1 | 3.1207 | 67.4 | 0.2887 | 0.2069 | 6.629 | 8.98 | 71.4 |
| Batch #2 | 2.8514 | 59.0 | 0.2229 | 0.2053 | 7.20 | 13.14 | 26.0 |

As will be seen from this table, when the active ingredient is incorporated into the gum formula in accordance with the method of this invention, an improvement of close to 300% in the amount of active ingredient released is obtained.

The analysis of the samples were carried out by measurements determining the percent of dicalcium phosphate dihydrate present in the gum sample, the weight attenuation of the wad on chewing the the release of the phosphate on chewing. The analysis of dicalcium phosphate was made by total ignition of the sample followed by calculating the residue as calcium pyrophosphate. In computing the residue, correction was made for the calcium component content of the gum base on the basis of a control sample in which calcium was found to be 1.187% by weight of the sample. The weight attenuation was found by weighing the gum wads after chewing and prior to ignition.

EXAMPLE 2

All of the corn syrup that was to go into the gum batch was separated and mixed with dicalcium phosphate. The gum syrup-dicalcium phosphate mix was a heavy light colored mixture similar to caramel paste. The gum batch was then prepared in a normal manner (i.e. the gum base was added to the gum kettle and mixed with the corn syrup dicalcium phosphate mixture). After mixing the gum was unloaded and rolled in the normal manner. Samples of the gum were chewed and the gum was then analyzed in the manner described in Example 1 to determine the percent of release of the dicalcium phosphate from the gum. Results indicated that a total of about 80% release was obtained.

EXAMPLE 3

Three batches of slab gums were made in the following manner. In Batch No. 1, a proteolytic enzyme was incorporated into the gum batch without any prior treatment and mixed thoroughly therewith. The gum was then processed in the normal manner. In Batch No. 2, all of the corn syrup that was to go into the gum batch was separated and mixed with a proteolytic enzyme. The mixture of enzyme and corn syrup was then added to the gum base and sucrose and the gum was thereafter processed in the normal manner. In Batch No. 3 a proteolytic enzyme was added to one-half of the normal complement of corn syrup and thoroughly mixed therewith. This mixture replaced an equal portion of the corn syrup normally used in the making of slab gums. This mixture was then added to a gum batch containing the gum base, sucrose, flavoring and the remaining portion of corn syrup and thoroughly mixed therewith. The slab gum was then processed in the normal manner.

Slab gums from all three batches were then chewed for 30 minutes. The gums were then analyzed in the manner described in Example 1 to determine the percent of release of the proteolytic enzyme from the gums. In Batch No. 1 a release of 50% of proteolytic enzyme was obtained, in Batch No. 2 a release of 74% of proteolytic enzyme was obtained, and in Batch No. 3 a release of 92% of the proteolytic enzyme was obtained.

As will be seen from the above data, the methods of this invention provided for release of active ingredients of from about 50% to about 84% more than that obtained using the conventional prior art method.

Having thus provided a written description of the present invention and provided specific examples thereof, it should be understood that no undue restrictions or limitations are to be imposed by reason thereof but that the present invention is defined by the appended claims.

We claim:

1. The method of preparing slab chewing gum containing solid active ingredients which are not freely soluble, corn syrup, sucrose and an insoluble gum base which tends to bind said active ingredients against release from the slab gum during the chewing of said gum, said method comprising intimately admixing said active ingredient in at least a portion of said corn syrup prior to mixing said corn syrup portion with said insoluble gum base, intimately mixing all of the materials together and then forming from said mixture units for use.

2. The method according to claim 1 wherein said active ingredients are selected from the group consisting of phosphates, vitamins, chlorphyllins, enzymes, and fluorides.

3. The method of preparing slab chewing gum containing solid active ingredients, corn syrup, sucrose and an insoluble gum base which tends to bind said solid active ingredients against release from the slab gum in the chewing of said gum, said method comprising forming a mixture of said sucrose, gum base and a portion of said corn syrup, forming a second mixture with another portion of said corn syrup and said active ingredient, intimately mixing both mixtures so as to form a homogeneous blend and then forming from said mixture units for use.

4. The method according to claim 3 wherein said active ingredient is selected from the group consisting of phosphates, chlorphylls, vitamins, enzymes and fluorides.

5. The method of preparing slab chewing gum containing solid active ingredients which are not freely soluble, corn syrup, sucrose and an insoluble gum base which tends to bind said solid active ingredients against release from the slab gum in the chewing of said gum, said method comprising intimately admixing said active ingredient with the total requirement of corn syrup in the gum, and then blending said corn syrup-active ingredient mixture with the insoluble gum base and sucrose so as to form a homogeneous mixture of all materials and then forming from said mixture units for use.

6. The method of preparing slab chewing gum containing solid active ingredients which are not freely soluble, corn syrup, sucrose and an insoluble gum base which tends to bind said solid active ingredients against release from the slab gum during the chewing of said gum, said method comprising intimately admixing powdered active ingredient in at least a portion of said corn syrup prior to mixing said corn syrup portion with said insoluble gum base, intimately mixing all of the materials and then forming from said mixture units for use capable of releasing at least about 65% of the active ingredient upon chewing.

7. The method of preparing slab chewing gum containing solid active ingredients which are not freely soluble, corn syrup, sucrose and an insoluble gum base which tends to bind said solid active ingredients against release from the slab gum in the chewing of said gum, said method comprising intimately admixing the powdered active ingredient in all of the corn syrup requirement of said gum prior to mixing said corn syrup with said insoluble gum base, intimately mixing all of the materials together and then forming from said mixture units for use capable of releasing upon chewing at least about 65% of the active ingredient.

8. The method of preparing slab chewing gum containing solid active ingredients which are not freely soluble, corn syrup, sucrose and an insoluble gum base which tends to bind said solid active ingredients against release from the slab gum during the chewing of said gum, said method comprising separating a portion of the corn syrup requirement to be used in the preparation of the gum, intimately admixing with said separated portion of corn syrup powdered active ingredient, mixing the remaining portion of said corn syrup with the gum base and sucrose so as to form a homogeneous mixture thereof, intimately mixing both of said mixtures so as to form a single homogeneous mixture and then forming from said mixture units for use capable of releasing about 65% of active ingredient upon chewing.

9. The method of preparing slab chewing gum containing solid active ingredients which are not freely soluble, corn syrup, sucrose and an insoluble gum base which tends to bind said solid active ingredients against release from the slab gum during the chewing of said gum, said method comprising intimately admixing powdered active ingredient having an average mesh size of less than 100 in at least a portion of said corn syrup prior to mixing said corn syrup portion with said insoluble gum base, intimately mixing all of the materials and then forming from said mixture units for use.

10. The method of preparing slab chewing gum containing dicalcium phosphate, corn syrup, sucrose and an insoluble gum base which tends to bind said dicalcium phosphate against release from the slab gum during the chewing of said gum, said method comprising intimately admixing about 1.0 to about 10% by weight dicalcium phosphate having an average mesh size of less than 100 with at least a portion of said corn syrup prior to mixing said corn syrup portion with said insoluble gum base, intimately mixing all of the materials together and then forming from said mixture units for use.

11. The method according to claim 10 wherein said dicalcium phosphate has an average mesh size of about 270.

12. The method according to claim 10 wherein said dicalcium phosphate is added to all of the corn syrup prior to mixing said corn syrup with the insoluble corn base.

13. The method of preparing slab chewing gum containing an enzyme, corn syrup, sucrose and an insoluble gum base which tends to bind said enzyme against release from the slab gum during the chewing of said gum, said method comprising intimately admixing about 0.05% to about 15% by weight of an enzyme having an average mesh size of less than 100 with at least a portion of said corn syrup prior to mixing said corn syrup portion with said insoluble gum base, intimately mixing all of the said materials together and then forming from said mixture units for use.

14. The method according to claim 13 wherein said enzyme has an average mesh size of about 270.

15. The method according to claim 13 wherein said enzyme is added to all of said corn syrup prior to mixing said corn syrup with said insoluble gum base.

16. A slab chewing gum comprising an insoluble gum base which tends to bind solid active ingredients against release from the gum during the chewing of the gum homogeneously blended with sucrose, flavors, corn syrup and solid active ingredients having an average mesh size of less than 100 suspended in said corn syrup.

17. A slab chewing gum comprising an insoluble gum base which tends to bind solid active ingredients against release from the gum during the chewing of the gum homogeneously blended with sucrose, flavors, corn syrup and solid active ingredients having an average mesh size of less than 100 which are dispersed throughout the corn syrup.

References Cited in the file of this patent

UNITED STATES PATENTS 3,011,949    Bilotti _____ Dec. 5, 1961